US 12,541,950 B2

(12) United States Patent
Kim et al.

(10) Patent No.: US 12,541,950 B2
(45) Date of Patent: Feb. 3, 2026

(54) METHOD AND ELECTRONIC DEVICE WITH FEATURE VECTOR AND FEATURE MAP OUTPUT

(71) Applicant: Samsung Electronics Co., Ltd., Suwon-si (KR)

(72) Inventors: Hyunsoo Kim, Suwon-si (KR); Seijoon Kim, Suwon-si (KR); Minyoung Mun, Suwon-si (KR); Seungkeun Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 338 days.

(21) Appl. No.: 18/310,075

(22) Filed: May 1, 2023

(65) Prior Publication Data

US 2024/0144653 A1 May 2, 2024

(30) Foreign Application Priority Data

Nov. 1, 2022 (KR) ........................ 10-2022-0143603

(51) Int. Cl.
*G06V 10/00* (2022.01)
*G06V 10/50* (2022.01)
(Continued)

(52) U.S. Cl.
CPC .......... *G06V 10/7715* (2022.01); *G06V 10/50* (2022.01); *G06V 10/761* (2022.01); *G06V 10/774* (2022.01); *G06V 10/82* (2022.01)

(58) Field of Classification Search
CPC .... G06V 10/82; G06V 10/7715; G06V 10/50; G06V 10/761; G06V 10/774; G06N 20/00; G06N 20/10; G06N 20/20
See application file for complete search history.

(56) References Cited

U.S. PATENT DOCUMENTS 8,238,650 B2    8/2012  Gotting et al.
8,913,839 B2 *  12/2014 Ricanek, Jr. ......... G06V 40/172
                                                382/226
(Continued)

FOREIGN PATENT DOCUMENTS

KR        10-2283265 B1    7/2021
KR     10-2022-0071412 A   5/2022

OTHER PUBLICATIONS

Yeong-Mok Ahn; KR19980045012A Vector Quantization Codebook Generation Method Using Classification Performance. Publication Date: Sep. 15, 1998.*

(Continued)

*Primary Examiner* — Amir Alavi
(74) *Attorney, Agent, or Firm* — NSIP Law

(57) ABSTRACT

A processor-implemented method includes: determining distances between an input vector and center vectors comprised in a plurality of output nodes comprised in a trained codebook; and outputting a first feature vector of the input vector based on the distances between the center vectors and the input vector, wherein the trained codebook is trained by: determining a distance between a training input vector and the center vector for each of the output nodes; determining, among the plurality of output nodes, a best matched unit (BMU) in which a distance between the training input vector and the center vector of the BMU is minimized; and training the codebook by updating the center vector of the BMU, based on the distance between the training input vector and the center vector of the BMU.

20 Claims, 11 Drawing Sheets

(51) Int. Cl.
    *G06V 10/74*     (2022.01)
    *G06V 10/77*     (2022.01)
    *G06V 10/774*     (2022.01)
    *G06V 10/82*     (2022.01)

(56) References Cited

U.S. PATENT DOCUMENTS

| | | | |
|---|---|---|---|
| 8,977,374 | B1 | 3/2015 | Eck et al. |
| 9,135,502 | B2 * | 9/2015 | Haker ............ G06T 19/20 |
| 9,232,205 | B2 | 1/2016 | Suzuki et al. |
| 9,875,397 | B2 * | 1/2018 | Hwang ............ G06V 10/764 |
| 10,614,342 | B1 * | 4/2020 | Lorbert ............ G06V 10/764 |
| 10,970,645 | B1 | 4/2021 | Kim et al. |
| 11,600,282 | B2 * | 3/2023 | Zeghidour ............ G10L 19/038 |
| 11,804,069 | B2 * | 10/2023 | Gan ............ G06F 18/23213 |
| 12,039,449 | B2 * | 7/2024 | Park ............ G06F 17/18 |
| 12,056,911 | B1 * | 8/2024 | Shalev ............ G06F 18/22 |
| 12,094,236 | B2 * | 9/2024 | Skans ............ G06V 40/23 |
| 12,311,972 | B2 * | 5/2025 | Pronovost ............ B60W 40/04 |
| 2004/0153796 | A1 * | 8/2004 | Honkanen ............ G06F 11/3604 714/27 |
| 2021/0165852 | A1 | 6/2021 | Granger et al. |
| 2021/0209408 | A1 | 7/2021 | Ren et al. |
| 2021/0312234 | A1 | 10/2021 | Jang et al. |
| 2021/0406694 | A1 | 12/2021 | Kim |
| 2024/0144653 | A1 * | 5/2024 | Kim ............ G06V 10/774 |

OTHER PUBLICATIONS

Rebuffi, Sylvestre-Alvise, et al. "Efficient parametrization of multi-domain deep neural networks." *Proceedings of the IEEE Conference on Computer Vision and Pattern Recognition.* (2018). pp. 8119-8127.

Wang, Ximei, et al. "Transferable normalization: Towards improving transferability of deep neural networks." *Advances in neural information processing systems* vol. 32 (2019). pp. 1-11.

Bayasi, Nourhan, et al. "BoosterNet: Improving Domain Generalization of Deep Neural Nets using Culpability-Ranked Features." *Proceedings of the IEEE/CVF Conference on Computer Vision and Pattern Recognition.* (2022). pp. 538-548.

Doevenspeck, Jonas, et al. "Noise tolerant ternary weight deep neural networks for analog in-memory inference." *2021 International Joint Conference on Neural Networks (IJCNN).* IEEE, (2021). pp 1-8.

Kohonen, Teuvo. "Exploration of very large databases by self-organizing maps." *Proceedings of international conference on neural networks (icnn'97).* vol. 1. IEEE, (1997). pp 1-6.

Kim, Youngeun, et al. "Gradient-based bit encoding optimization for noise-robust binary memristive crossbar." *2022 Design, Automation & Test in Europe Conference & Exhibition (DATE).* IEEE, (2022). pp 1-4.

Ts'o, Daniel Y., et al. "Whither the hypercolumn?." *The Journal of physiology* vol. 587. Issue 12 (2009). pp. 2791-2805.

Hubel, David H., et al. "Shape and arrangement of columns in cat's striate cortex." *The Journal of physiology* vol. 165. Issue 3 (1963). pp. 559-570.

Jung, Seungchul, et al. "A crossbar array of magnetoresistive memory devices for in-memory computing." *Nature* vol. 601. Issue 7892 (2022). pp. 211-227.

* cited by examiner

| | | Class #1 | Class #2 | Class #3 | Class #4 | Class #5 | Class #6 | Class #7 | Class #8 | Class #9 | Class #10 |
|---|---|---|---|---|---|---|---|---|---|---|---|
| OFM2 | Class #1 | 33428.71 | 38644.49 | 35963.44 | 36741.36 | 34697.58 | 35884.79 | 37799.70 | 37982.71 | 36820.03 | 37823.08 |
| | Class #2 | 38644.49 | 37140.34 | 37155.04 | 37460.20 | 35833.57 | 36790.93 | 39059.50 | 38710.73 | 37329.58 | 38250.10 |
| | Class #3 | 35963.44 | 37155.04 | 32026.78 | 34629.01 | 31853.43 | 33956.87 | 35580.16 | 35515.73 | 35237.55 | 36063.85 |
| | Class #4 | 36741.36 | 37460.20 | 34629.01 | 32676.18 | 32975.29 | 34245.23 | 36098.91 | 36149.87 | 35727.65 | 36932.90 |
| | Class #5 | 34697.58 | 35833.57 | 31853.43 | 32975.29 | 27292.06 | 32433.00 | 33477.03 | 33788.04 | 34529.66 | 35165.05 |
| | Class #6 | 35884.79 | 36790.93 | 33956.87 | 34245.23 | 32433.00 | 29927.65 | 35332.03 | 35341.98 | 35725.69 | 36367.04 |
| | Class #7 | 37799.70 | 39059.50 | 35580.16 | 36098.91 | 33477.03 | 35332.03 | 35611.30 | 36682.75 | 39023.18 | 38459.62 |
| | Class #8 | 37982.71 | 38710.73 | 35515.73 | 36149.87 | 33788.04 | 35341.98 | 36682.75 | 33695.11 | 37738.22 | 37776.53 |
| | Class #9 | 36820.03 | 37329.58 | 35237.55 | 35727.65 | 34529.66 | 35725.69 | 39023.18 | 37738.22 | 26085.89 | 35771.90 |
| | Class #10 | 37823.08 | 38250.10 | 36063.85 | 36932.90 | 35165.05 | 36367.04 | 38459.62 | 37776.53 | 35771.90 | 35172.93 |

OFM1

FIG. 7A

|  | OFM1 | | | | | | | | | |
|---|---|---|---|---|---|---|---|---|---|---|
|  | Class #1 | Class #2 | Class #3 | Class #4 | Class #5 | Class #6 | Class #7 | Class #8 | Class #9 | Class #10 |
| Class #1 | 253368.09 | 270231.85 | 275219.62 | 270248.79 | 268302.94 | 265241.95 | 265937.85 | 270193.86 | 263542.92 | 270633.81 |
| Class #2 | 270231.85 | 243561.50 | 259757.73 | 253382.48 | 245268.89 | 247907.90 | 248337.48 | 256318.26 | 254740.66 | 260620.46 |
| Class #3 | 275219.62 | 259757.73 | 244335.24 | 252362.31 | 241144.02 | 249721.56 | 250073.11 | 255257.23 | 246972.10 | 260188.84 |
| Class #4 | 270248.79 | 253382.48 | 252362.31 | 229935.34 | 233076.12 | 238764.67 | 240505.41 | 245707.88 | 244772.31 | 257151.37 |
| Class #5 | 268302.94 | 245268.89 | 241144.02 | 233076.12 | 197409.50 | 226583.47 | 231504.21 | 238054.46 | 239533.19 | 248419.28 |
| Class #6 | 265241.95 | 247907.90 | 249721.56 | 238764.67 | 226583.47 | 206652.24 | 231780.89 | 237858.44 | 246356.80 | 253536.75 |
| Class #7 | 265937.85 | 248337.48 | 250073.11 | 240505.41 | 231504.21 | 231780.89 | 215864.32 | 235671.33 | 255837.46 | 253608.63 |
| Class #8 | 270193.86 | 256318.26 | 255257.23 | 245707.88 | 238054.46 | 237858.44 | 235671.33 | 219287.10 | 256277.13 | 256235.07 |
| Class #9 | 263542.92 | 254740.66 | 246972.10 | 244772.31 | 239533.19 | 246356.80 | 255837.46 | 256277.13 | 187919.71 | 246739.71 |
| Class #10 | 270633.81 | 260620.46 | 260188.84 | 257151.37 | 248419.28 | 253536.75 | 253608.63 | 256235.07 | 246739.71 | 238604.75 |

FIG. 7B

METHOD AND ELECTRONIC DEVICE WITH FEATURE VECTOR AND FEATURE MAP OUTPUT

CROSS-REFERENCE TO RELATED APPLICATIONS

This application claims the benefit under 35 USC § 119(a) of Korean Patent Application No. 10-2022-0143603, filed on Nov. 1, 2022 in the Korean Intellectual Property Office, the entire disclosure of which is incorporated herein by reference for all purposes.

BACKGROUND

1 Field

The following description relates to an electronic device and method with feature vector and feature map output.

2. Description of Related Art

A deep neural network model may be trained through a global training method represented as a backpropagation algorithm in order to learn a predetermined training task with high accuracy.

The operation principle of the global training method may prepare input data (input data for training) used for training in advance, receive each piece of input data to define an expected value (target output data) that a model needs to finally output, and then define the structure of the model.

An error between an actual value actually output by the model and the expected value may be measured upon receipt of the input data for training, such that a weight value may be updated to reduce the error.

The deep neural network model may repeat the above process multiple times, such that the deep neural network model may be trained to perform a predetermined training task with high accuracy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a processor-implemented method includes: determining distances between an input vector and center vectors comprised in a plurality of output nodes comprised in a trained codebook; and outputting a first feature vector of the input vector based on the distances between the center vectors and the input vector, wherein the trained codebook is trained by: determining a distance between a training input vector and the center vector for each of the output nodes; determining, among the plurality of output nodes, a best matched unit (BMU) in which a distance between the training input vector and the center vector of the BMU is minimized; and training the codebook by updating the center vector of the BMU, based on the distance between the training input vector and the center vector of the BMU.

The training of the codebook may include: determining distances between the plurality of output nodes and the BMU, using position coordinates of the plurality of output nodes; and training the codebook by updating the center vectors of the plurality of output nodes, based on the distances between the plurality of output nodes and the BMU.

The updating of the center vectors of the plurality of output nodes may include: determining a plurality of weights based on the distances between the plurality of output nodes and the BMU; and updating the center vectors of the plurality of output nodes by respectively applying the weights to the center vectors.

The determining of the weights may include, in response to a first distance being greater than a second distance among the distances between the plurality of output nodes and the BMU, determining a first weight determined based on the first distance to be less than a second weight determined based on the second distance among the weights.

The method may include: based on position coordinates of elements comprised in the first feature vector, determining an average of elements within a set range; and outputting a second feature vector, using the position coordinates of the elements and the average of the elements, wherein the position coordinates of the elements correspond to position coordinates of the plurality of output nodes.

The method may include outputting an output feature vector by inputting the second feature vector into a convolutional neural network.

The method may include generating the input vector by: generating a plurality of segmented images from an input image, using a scan window having a set size; and generating the input vector, using the plurality of segmented images, wherein the outputting of the first feature vector of the input vector may include outputting a first feature map of the input image, based on a distance between the center vector and the input vector for each of the plurality of segmented images.

The method may include: based on position coordinates of channels comprised in the first feature map, determining an average of channels within a set range; and outputting a second feature vector, using the position coordinates of the channels and the average of the channels, wherein the position coordinates of the channels correspond to position coordinates of the plurality of output nodes.

In one or more general aspects, a non-transitory computer-readable storage medium stores instructions that, when executed by a processor, configure the processor to perform any one, any combination, or all of operations and/or methods described herein.

In one or more general aspects, a processor-implemented method includes: generating a plurality of segmented maps from an input map; determining distances between the plurality of segmentation maps and center vectors comprised in a plurality of output nodes comprised in a trained codebook; and outputting a first feature map of the input map, based on the distances between the plurality of segmentation maps and the center vectors, wherein the trained codebook is trained by: determining distances between the center vectors and a training segmented map segmented from a training input map; determining, among the plurality of output nodes, a best matched unit (BMU) in which a distance between the training segmented map and the center vector of the BMU is minimized; and training the codebook by updating the center vector of the BMU, based on the distance between the training segmented map and the center vector of the BMU.

The training of the codebook may include: determining distances between the plurality of output nodes and the BMU, using position coordinates of the plurality of output nodes; and training the codebook by updating the center vectors of the plurality of output nodes, based on the distances between the plurality of output nodes and the BMU.

The updating of the center vectors of the plurality of output nodes may include: determining a plurality of weights based on the distances between the plurality of output nodes and the BMU; and updating the center vectors of the plurality of output nodes by respectively applying the weights to the center vectors.

The determining of the weights may include, in response to a first distance being greater than a second distance among the distances between the plurality of output nodes and the BMU, determining a first weight determined based on the first distance to be less than a second weight determined based on the second distance among the weights.

The method may include: based on position coordinates of channels comprised in the first feature map, determining an average of channels within a set range; and outputting a second feature map, using the position coordinates of the channels and the average of the channels, wherein the position coordinates of the channels correspond to position coordinates of the plurality of output nodes.

In one or more general aspects, an electronic device includes: one or more processors configured to: determine distances between an input vector and center vectors comprised in a plurality of output nodes comprised in a trained codebook; and output a first feature vector of the input vector, based on the distances between the center vectors and the input vector, wherein the trained codebook is trained by: determining a distance between a training input vector and the center vector for each of the output nodes; determining, among the plurality of output nodes, a best matched unit (BMU) in which a distance between the training input vector and the center vector of the BMU is minimized; and training the codebook by updating the center vector of the BMU, based on the distance between the training input vector and the center vector of the BMU.

The training of the codebook may include: determining distances between the plurality of output nodes and the BMU, using position coordinates of the plurality of output nodes; and training the codebook by updating the center vectors of the plurality of output nodes, based on the distances between the plurality of output nodes and the BMU.

The one or more processors may be configured to: based on position coordinates of elements comprised in the first feature vector, determine an average of elements within a set range; and output a second feature vector, using the position coordinates of the elements and the average of the elements, wherein the position coordinates of the elements correspond to position coordinates of the plurality of output nodes.

The one or more processors may be configured to: generate a plurality of segmented images from an input image, using a scan window having a set size; generate the input vector, using the plurality of segmented images; and output a first feature map of the input image, based on a distance between the center vector and the input vector for each of the plurality of segmented images.

The one or more processors may be configured to: based on position coordinates of channels comprised in the first feature map, determine an average of channels within a set range; and output a second feature vector, using the position coordinates of the channels and the average of the channels, wherein the position coordinates of the channels correspond to position coordinates of the plurality of output nodes.

The electronic device may include a memory storing instructions that, when executed by the one or more processors, configure the one or more processors to perform the determining of the distances between the input vector and the center vectors comprised in the plurality of output nodes and the outputting of the first feature vector.

Other features and aspects will be apparent from the following detailed description, the drawings, and the claims.

BRIEF DESCRIPTION OF THE DRAWINGS

FIGS. 7A, 7B, and 7C illustrate various examples of distances for each class.

Figure 1:
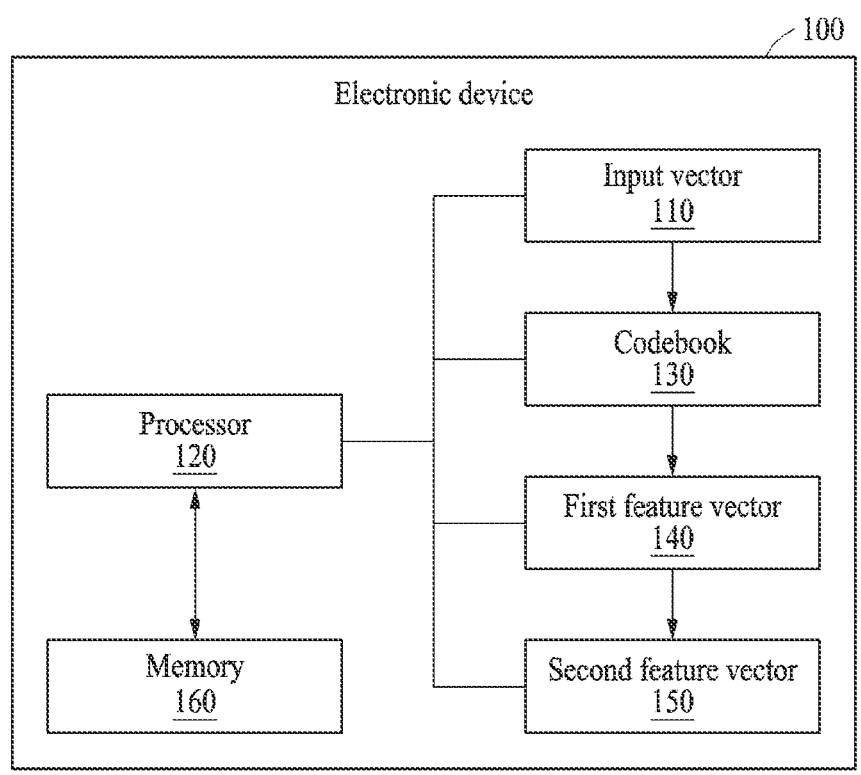
FIG. 1 illustrates various examples of an electronic device for outputting a feature vector.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "on", "connected to," "coupled to," or "joined to" another component, element, or layer it may be directly (e.g., in contact with the other component or element) "on", "connected to," "coupled to," or "joined to" the other component, element, or layer or there may reasonably be one or more other components, elements, layers intervening therebetween. When a component or element is described as being "directly on", "directly connected to," "directly coupled to," or "directly joined" to another component or element, there can be no other elements intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

As used herein, the term "and/or" includes any one and any combination of any two or more of the associated listed items. The phrases "at least one of A, B, and C", "at least one of A, B, or C', and the like are intended to have disjunctive meanings, and these phrases "at least one of A, B, and C", "at least one of A, B, or C', and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings. When describing the examples with reference to the accompanying drawings, like reference numerals refer to like constituent elements and a repeated description related thereto will be omitted.

FIG. 1 illustrates various examples of an electronic device 100 for outputting a feature vector.

Referring to FIG. 1, the electronic device 100 according to various examples may include a processor 120 (e.g., one or more processors) and a memory 160 (e.g., one or more memories).

The processor 120 may execute, for example, software (e.g., a program) to control at least one other component (e.g., a hardware or software component) of the electronic device 100 connected to the processor 120 and may perform various data processing or computations. According to an example, as at least a part of data processing or computations, the processor 120 may store a command or data received from another component (e.g., a sensor module, a communication module, and/or the memory 160) in a volatile memory, process the command or the data stored in the volatile memory, and store resulting data in a non-volatile memory of the memory 160. According to an example, the processor 120 may include a main processor (e.g., a central processing unit (CPU) or an application processor 120 (AP)), and/or an auxiliary processor (e.g., a graphics processing unit (GPU), a neural processing unit (NPU), an image signal processor (ISP), a sensor hub processor, and/or a communication processor (CP)) that is operable independently from or in conjunction with the main processor. For example, when the electronic device 100 includes a main processor and an auxiliary processor, the auxiliary processor may be adapted to consume less power than the main processor or to be specific to a specified function. The auxiliary processor may be implemented separately from the main processor or as a part of the main processor.

The auxiliary processor may control at least some of functions or states related to at least one (e.g., a display module, a sensor module, and/or a communication module) of the components of the electronic device 100, instead of the main processor while the main processor is in an inactive (e.g., sleep) state or along with the main processor while the main processor is in an active state (e.g., executing an application). According to an example, the auxiliary processor (e.g., an ISP 120 or a CP 120) may be implemented as a portion of another component (e.g., a camera module or a communication module) that is functionally related to the auxiliary processor. According to an example, the auxiliary processor (e.g., an NPU) may include a hardware structure specified for artificial intelligence (AI) model processing. An AI model may be generated by machine learning. Such learning may be performed by, for example, the electronic device 100 in which AI is performed, or performed via a separate server (e.g., a server). Learning algorithms may include, but are not limited to, for example, supervised learning, unsupervised learning, semi-supervised learning, and/or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and/or a bidirectional recurrent deep neural network (BRDNN), a deep Q-network, and/or a combination of two or more thereof, but is not limited thereto. The AI model may additionally or alternatively include a software structure other than the hardware structure.

The memory 160 may store various pieces of data used by at least one component (e.g., the processor 120 or a sensor module) of the electronic device 100. The various pieces of data may include, for example, software (e.g., a program) and input data or output data for a command related thereto. For example, the memory 160 may include a non-transitory computer-readable storage medium storing instructions that, when executed by the processor 120, configure the processor 120 to perform any one or any combination of any two or more of the methods and operations described herein with respect to FIGS. 1-7C. The memory 160 may include volatile memory or non-volatile memory. For example, the electronic device 100 may identify an input vector 110 and a codebook 130. For example, the electronic device 100 may identify and process input data to generate the input vector 110.

For example, the codebook 130 may be trained through a self-organizing map algorithm. For example, the codebook 130 may be trained to classify the input vector 110 into one of divided clusters. The electronic device 100 may calculate (e.g., determine) a distance between the input vector 110 and a plurality of output nodes included in the codebook 130 based on the codebook 130.

For example, the codebook 130 may include an input layer and an output layer. For example, the input layer may include the same number of input nodes as the dimension of the input vector 110, and the output layer may include the same number of output nodes as target clusters.

For example, each element of the input vector 110 may be input to an input node of the codebook 130. The output node of the codebook 130 may calculate a distance to a center vector (or a vector of the codebook 130) of the output node based on each element of the input vector 110 transferred to the input node. For example, the center vector may be a vector having the same dimension as the input vector 110. For example, the center vector of the output node may be understood as substantially equal to the weight of the output node.

For example, the electronic device 100 may output a first feature vector 140 of the input vector 110 based on a distance between the center vector and the input vector 110. For example, the electronic device 100 may output the first feature vector 140, using a distance between the center vector of each of the output nodes included in the codebook 130 and the input vector 110.

For example, the plurality of output nodes included in the codebook 130 may include position coordinates. For example, the output nodes may include position coordinates in a n-dimensional space (e.g., a one-dimensional (1D) space, a two-dimensional (2D) space, a three-dimensional (3D) space, and the like). For example, when the plurality of output nodes includes position coordinates in a 2D space, each of the output nodes may include position coordinates (n, m) (n and m are integers).

For example, the first feature vector 140 may include position coordinates corresponding to position coordinates of the output nodes. For example, when the position coordinates of each of the output nodes in the 2D space are n, m (n=1, 2 and m=1, 2), the first feature vector 140 may include position coordinates corresponding to the position coordinates of the output nodes. For example, a distance between the center vector of the output node at position coordinates (1, 1) and the input vector 110 may correspond to an element of position coordinates (1, 1) of the first feature vector 140.

As described above, the electronic device 100 may input the input vector 110 to the codebook 130 and calculate distances between the input vector 110 and the center vectors of the output nodes. The electronic device 100 may output the first feature vector 140 according to the position coordinates of the plurality of output nodes. Each element of the first feature vector 140 may correspond to a distance between the center vector of each of the output nodes and the input vector 110. The position coordinates of elements of the first feature vector 140 may correspond to the position coordinates of the output nodes.

The codebook 130 may be trained to calculate a distance between the input vector 110 and a plurality of divided clusters. The distance between the input vector 110 and the plurality of divided clusters may indicate a distance between the input vector 110 and the center vector of each of the output nodes.

For example, the electronic device 100 may train the codebook 130. For example, the electronic device 100 may determine the center vectors of the output nodes, using a training input vector 110.

For example, the electronic device 100 may identify the training input vector 110. Each center vector of the output nodes included in the codebook 130 may be initialized to an arbitrary value.

The electronic device 100 may calculate a distance between the training input vector 110 and the center vector of each of the output nodes. For example, the electronic device 100 may determine a best matched unit (BMU) having a minimum distance between the training input vector 110 and the center vector among output nodes. The electronic device 100 may update the center vector of the BMU based on the distance between the BMU and the training input vector 110 to train the codebook 130. The electronic device 100 may train the codebook 130 to minimize a difference between the center vector of the BMU and the training input vector 110.

The electronic device 100 may calculate distances between the input vector 110 and the center vectors of the output nodes, using the codebook 130 trained as described above.

For example, the distance between the input vector 110 or the training input vector 110 and the center vector may represent an Euclidean distance.

For example, the electronic device 100 may calculate an average of elements within a set range, based on the position coordinates of the elements included in the first feature vector 140.

The electronic device 100 may output a second feature vector 150, using the position coordinates of the elements and the average of the elements.

For example, the position coordinates of the elements may correspond to the position coordinates of the output nodes.

Figure 2:
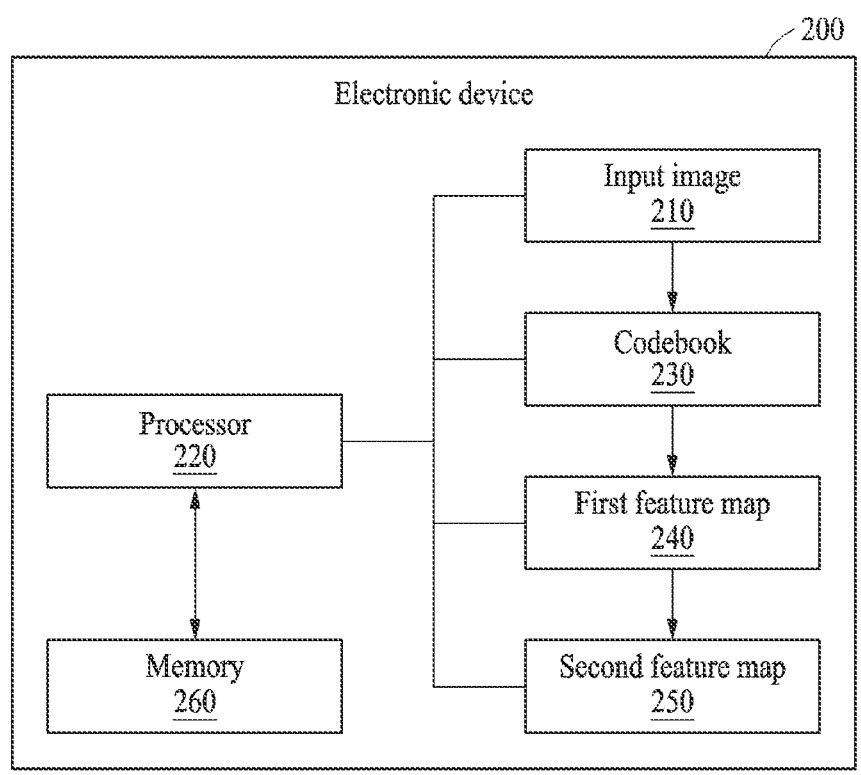
FIG. 2 illustrates various examples of an electronic device for outputting a feature map.

FIG. 2 illustrates various examples of an electronic device 200 for outputting a feature map.

Referring to FIG. 2, an electronic device 200 according to various examples may include a processor 220 (e.g., one or more processors) and a memory 260 (e.g., one or more memories).

For example, the electronic device 200 may identify an input map (e.g., an input image 210) and a codebook 230. For example, the electronic device 200 may generate a plurality of segmented maps from an input map 210. The electronic device 200 may generate the plurality of segmented maps by scanning the input map 210 according to a scan window with a set size.

For example, when a channel C, a height H, and a width W of the input map 210 are 3×32×32, the electronic device 200 may add a column of a pixel having a value of 0 to the top, bottom, left, and right sides of an image of each channel and generate the input map 210 having a size of 3×34×34. For example, the electronic device 200 may generate 3×32×32 number of segmented maps, using a 3×3 scan window.

For example, the electronic device 200 may use a plurality of output nodes included in the codebook 230 to calculate distances between the plurality of segmented maps and center vectors of the plurality of the output nodes. For example, the electronic device 200 may input the segmented maps to the input nodes included in the input layer of the codebook 230. For example, an element (e.g., a pixel value) of the segmented map may be input to each of the input nodes.

For example, center vectors of the output nodes may have the same size as the input segmented maps. For example, when the size of each of the segmented maps is 3×3×3, the size of the center vectors of the output nodes may be 3×3×3.

For example, the electronic device 200 may calculate distances between the segmented maps and the center vectors. For example, the electronic device 200 may calculate Euclidean distances between the segmented maps and the center vectors. The electronic device 200 may output a first feature map 240 based on distances between the segmented maps and the center vectors.

For example, the output nodes may include position coordinates expressed in an n-dimensional space. For example, when the output nodes include position coordinates in a 2D space, each of the output nodes may include position coordinates (n, m) (n and m are integers).

For example, the first feature map 240 may include position coordinates corresponding to the position coordinates of the output nodes. For example, a component of (n, m) of the first feature map 240 may be generated based on a distance between the segmented maps and the center coordinates of the output nodes of the position coordinates (n, m). The size of each component of the first feature map 240 may have the same size as the H×W of the input map 210.

For example, when the size of the input map 210 is 3×32×32 and the size of the scan window is 3×3, the size of each of the segmented maps may be 3×3×3. The electronic device 200 may generate 32×32 number of segmented maps from the input map 210.

For example, the number of output nodes may be 8×8 and include position coordinates in a 2D space. The center vectors of the output nodes may be substantially equal to the size of the segmented maps and may each have a size of 3×3×3.

For example, a distance between a segmented map scanned at a position (a, b) of each channel of the input map 210 and a center vector of position coordinates (n, m) may be a value of a pixel (a, b) in the image of the position coordinates (n, m) of the first feature map 240.

For example, the image of the position coordinates (n, m) of the first feature map 240 may include a distance between the segmented maps and the center vector of the position coordinates (n, m). In the above example, an image of (1, 1) of the first feature map 240 may have the same size of 32×32 as the W×H size of the input map 210. In the image of (1, 1) of the first feature map 240, the component of (1, 1) may represent a distance between a segmented map scanned at (1, 1) of each channel and a center vector of (1, 1). For example, in an image of (2, 1) of the first feature map 240, the component of (1, 1) may represent a distance between a segmented map scanned at (1, 1) of each channel and a center vector of (2, 1).

As described above, the electronic device 200 may generate the plurality of segmented maps from the input map 210 and input the plurality of segmented maps to the codebook 230 to calculate distances between the center vectors of the output nodes and the segmented maps, respectively. The electronic device 200 may output the first feature map 240 according to the position coordinates of the output nodes.

Each channel of the first feature map 240 may include a distance between the center vector of each of the output nodes and the input vector. The position coordinates of the channels of the first feature map 240 may correspond to the position coordinates of the output nodes.

The size of each channel of the first feature map 240 may correspond to the W×H of the input map 210. Each pixel value of the channels of the first feature map 240 may indicate a distance between a segmented map and a center vector.

The codebook 230 may be trained to calculate distances between the input map 210 and divided clusters. The distances between the input vector and the divided clusters may indicate distances between the input vector and the center vectors of the output nodes, respectively.

For example, the electronic device 200 may train the codebook 230. For example, the electronic device 200 may determine the center vectors of the output nodes, using a training input map 210. Training the codebook 230 for outputting the first feature map 240 may be performed substantially the same as training the codebook 230 for outputting the first feature vector.

For example, the electronic device 200 may calculate an average of channels within a set range, based on the position coordinates of channels included in the first feature map 240.

The electronic device 200 may output a second feature map 250, using the position coordinates of the channels and the average of the channels.

For example, the position coordinates of the channels may correspond to the position coordinates of the output nodes.

Figure 3A:
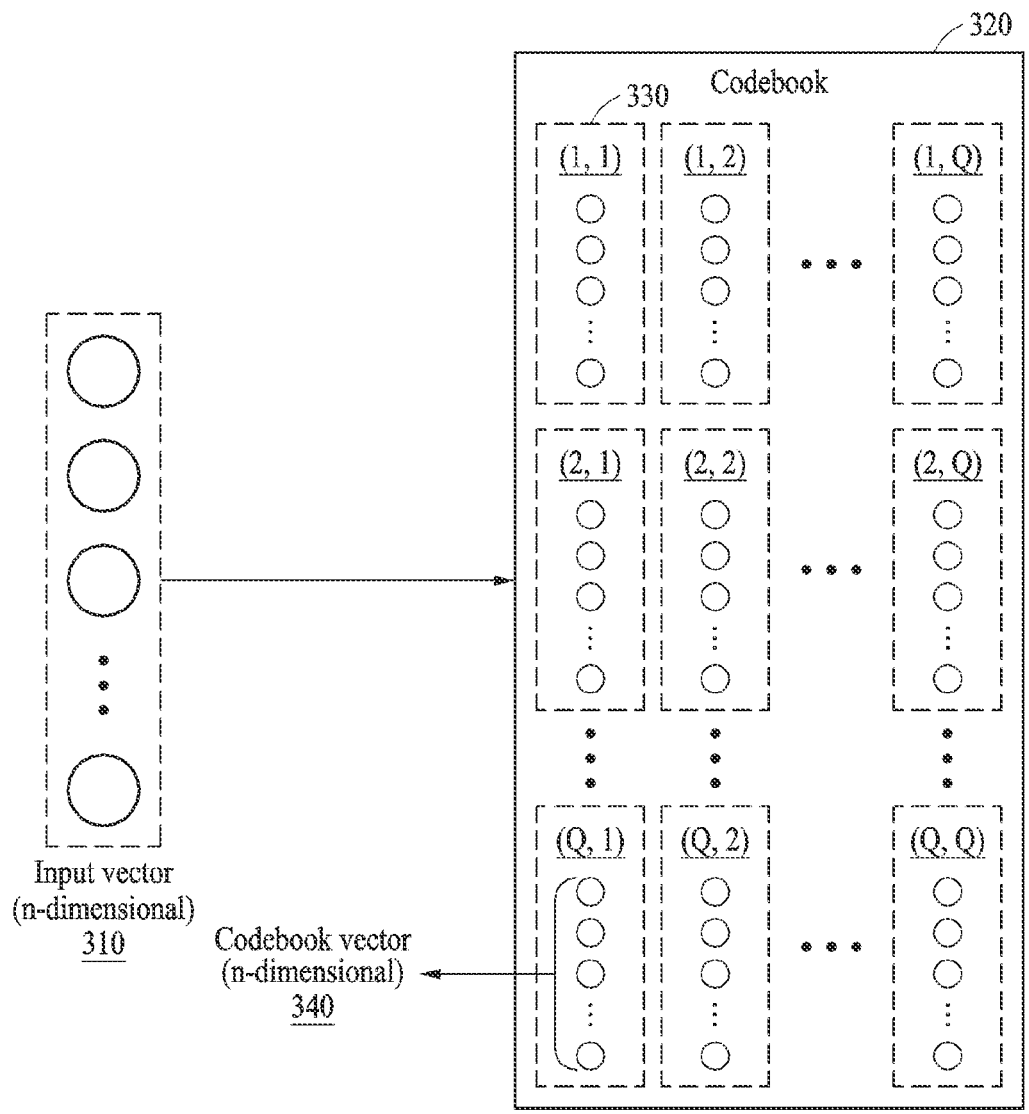
FIG. 3A illustrates various examples of a codebook and FIG. 3B illustrates a first feature vector and a second feature vector output according to various examples of a codebook.
Figure 3B:
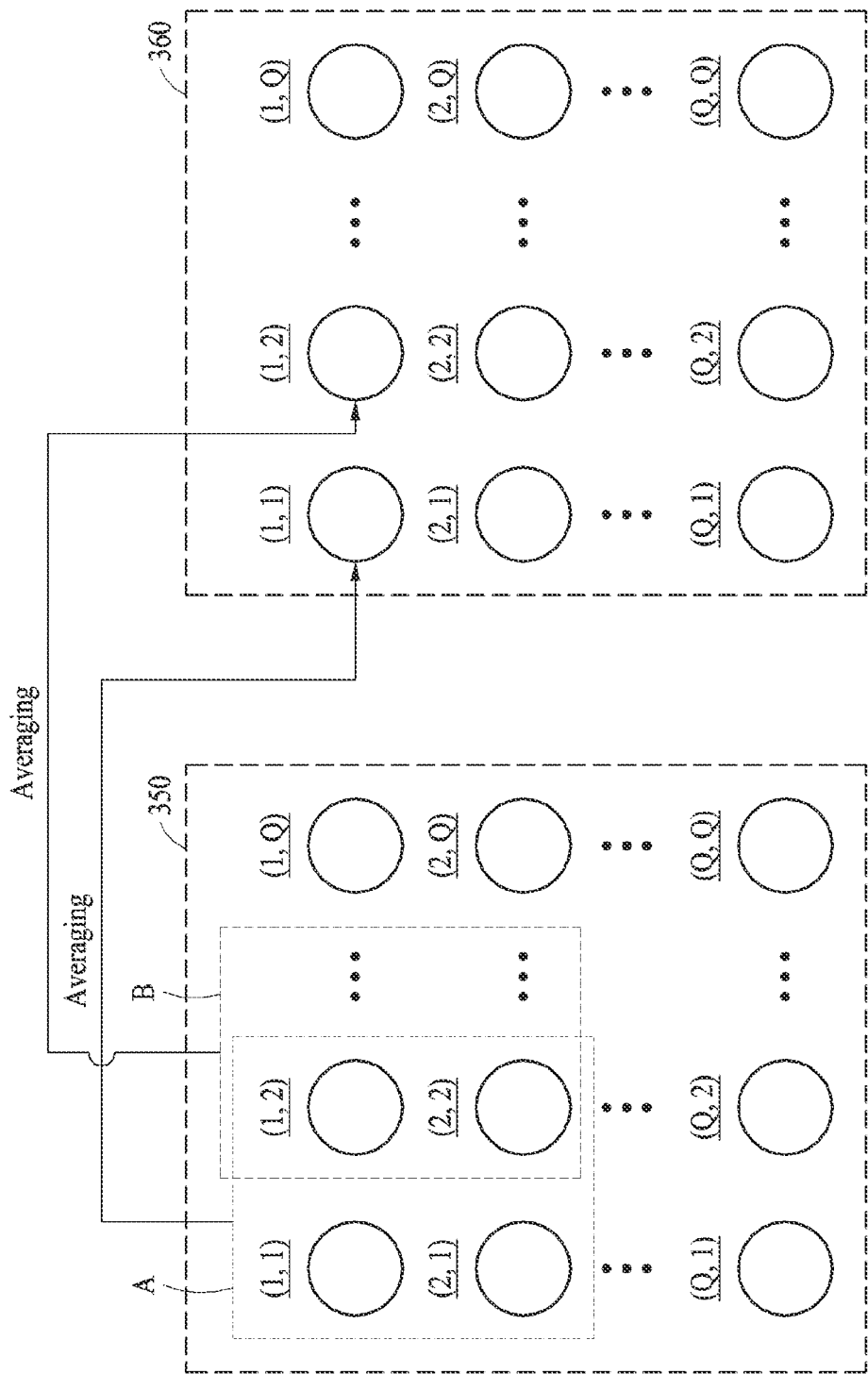

FIG. 3A illustrates various examples of a codebook 320 (e.g., the codebook 130 of FIG. 1) and FIG. 3B illustrates a first feature vector 350 and a second feature vector 360 output according to the various examples of the codebook 320.

Referring to FIG. 3A, an electronic device (e.g., the electronic device 100 of FIG. 1) according to an example may identify an input vector 310 (e.g., the input vector 110 of FIG. 1) and the codebook 320. The electronic device 100 may input the input vector 310 to an input layer of the codebook 320. For example, the input layer may include the same number of input nodes as the dimensions of the input vector 310. Each element of the input vector 310 may be input to a respective one of the input nodes.

For example, each of output nodes 330 included in the codebook 320 may include position coordinates in an n-dimensional space. For convenience of description, FIG. 3A shows the output nodes 330 arranged in Q×Q in a 2D space and having position coordinates but are not limited thereto.

For example, each of the output nodes 330 may include a center vector (e.g., a codebook vector 340). For example, the dimension of a center vector 340 may be set to be the same as that of the input vector 310. For example, in FIG. 3A, when the input vector 310 is n-dimensional, the center vector 340 may be n-dimensional.

Referring to FIGS. 3A and 3B, the electronic device 100 according to an example may output the first feature vector 350 (e.g., the first feature vector 140 of FIG. 1) based on distances between the input vector 310 and the center vectors 340.

For example, the first feature vector 350 may include the same number of elements as the number of output nodes 330. For example, when the number of output nodes 330 is Q×Q as in the foregoing example, the number of elements of the first feature vector 350 may be Q×Q. Position coordinates of the elements of the first feature vector 350 may correspond to the position coordinates of the output nodes 330, respectively.

For example, an element (n, m) of the first feature vector 350 may indicate a distance between the center vector 340 of the output node 330 of (n, m) and the input vector 310. For example, an element (1, 1) of the first feature vector 350 may indicate a distance between the input vector 310 and the center vector 340 of the output node 330 of (1, 1). An element (3, 3) of the first feature vector 350 may represent a distance between the input vector 310 and the center vector 340 of the output node 330 of (3, 3). As described above, position coordinates (n, m) of the first feature vector 350 may correspond to position coordinates (n, m) of the output nodes 330.

Referring to FIG. 3B, the electronic device 100 according to an example may calculate an average of elements within a set range (or area) based on position coordinates of the elements included in the first feature vector 350. The electronic device 100 may output the second feature vector 360 (e.g., the second feature vector 150 of FIG. 1) using the position coordinates of the elements and the average of the elements.

For example, as shown in FIG. 3B, an electronic device 100 may calculate an element (1, 1) of the second feature vector 360 based on an average of an element (1, 1), an element (1, 2), an element (2, 1), and an element (2, 2) within a range A (or an area) of the first feature vector 350. For example, the range A may be set based on the position coordinates of the element (1, 1) included in the first feature vector 350. The electronic device 100 may perform averaging on the elements within the set range A, based on the position coordinates of the element (1, 1) included in the first feature vector 350, and thus calculate the element (1,1) of the second feature vector 360.

In FIG. 3B, the electronic device 100 may calculate an element (1, 2) of the second feature vector 360 based on an average of an element (1, 2), an element (1, 3), an element (2, 2), and an element (2, 3) within a range B of the first feature vector 350. The range B may be set based on the position coordinates of the element (1, 2) of the first feature vector 350.

FIG. 3B illustrates an example of a set range including elements of position coordinates (n, m), (n, m+1), (n+1, m), and (n+1, m+1) of the first feature vector 350, based on the position coordinates (n, m) of an element of the first feature vector 350. The set range shown in FIG. 3B corresponds to one example among various examples and is not limited thereto.

For example, the electronic device 100 may set a range based on the position coordinates of elements included in the second feature vector 360. For example, in FIG. 3B, the range A may be set based on the position coordinates of an element (1, 1) included in the second feature vector 360. In FIG. 3B, the range B may be set based on the position coordinates of an element (1, 2) included in the second feature vector 360.

In the example shown in FIG. 3B, the electronic device 100 may output elements (Q, 1) and (1, Q) of the second feature vector 360. For example, the electronic device 100 may use an average of elements (Q, 1) and (Q, 2) of the first feature vector 350 to output the element (Q, 1) of the second feature vector 360. In accordance with the range set in the above example, since the first feature vector 350 does not include elements (Q+1, 1) and (Q+1, 2), the electronic device 100 may set an exceptional case for the set range in advance to calculate the elements (Q, 1) and (1, Q) of the second feature vector 360.

For example, referring to FIG. 3A, a training device (e.g., the electronic device 100) according to an example may train the codebook 320. For example, the training device may train the codebook 320 to classify the input vector 310 into at least one of a plurality of clusters. For example, classifying the input vector 310 into one of the clusters may include classifying the input vector 310 as corresponding to the closest output node among the output nodes 330 included in the codebook 320. The electronic device 100 may calculate distances between the input vector 310 and the center vector 340 of each of the output nodes 330, based on the trained codebook 320. The closest output node may correspond to the shortest distance among the calculated distances.

For example, the training device may calculate a distance between a training input vector 310 and the center vector 340 of each of the output nodes 330. The training input vector 310 may be substantially the same as the input vector 310 described above and may refer to data used for training the codebook 320.

For example, the training device may determine a best matched unit (BMU) having a minimum distance between the training input vector 310 and the center vector 340 among the plurality of output nodes 330.

For example, the training device may update the center vector 340 of the BMU to train the codebook 320, based on a distance between the BMU and the training input vector 310.

For example, the training device may calculate distances between the output nodes 330 and the BMU based on the position coordinates of the output nodes 330. For example, the training device may train the codebook 320 by updating the center vectors 340 of the output nodes 330 based on the distances between the output nodes 330 and the BMU.

The operation of the training device for training the codebook 320 may be substantially the same as the operation of a training device for training a codebook 420 described with reference to FIGS. 4A and 4B. For example, the training device may calculate a distance between the input vector 310 and the center vector 340 according to Equation 1 and determine the BMU according to Equation 2. The training device may update the center vectors 340 of the output nodes 330 according to Equations 3 and 4.

Figure 4A:
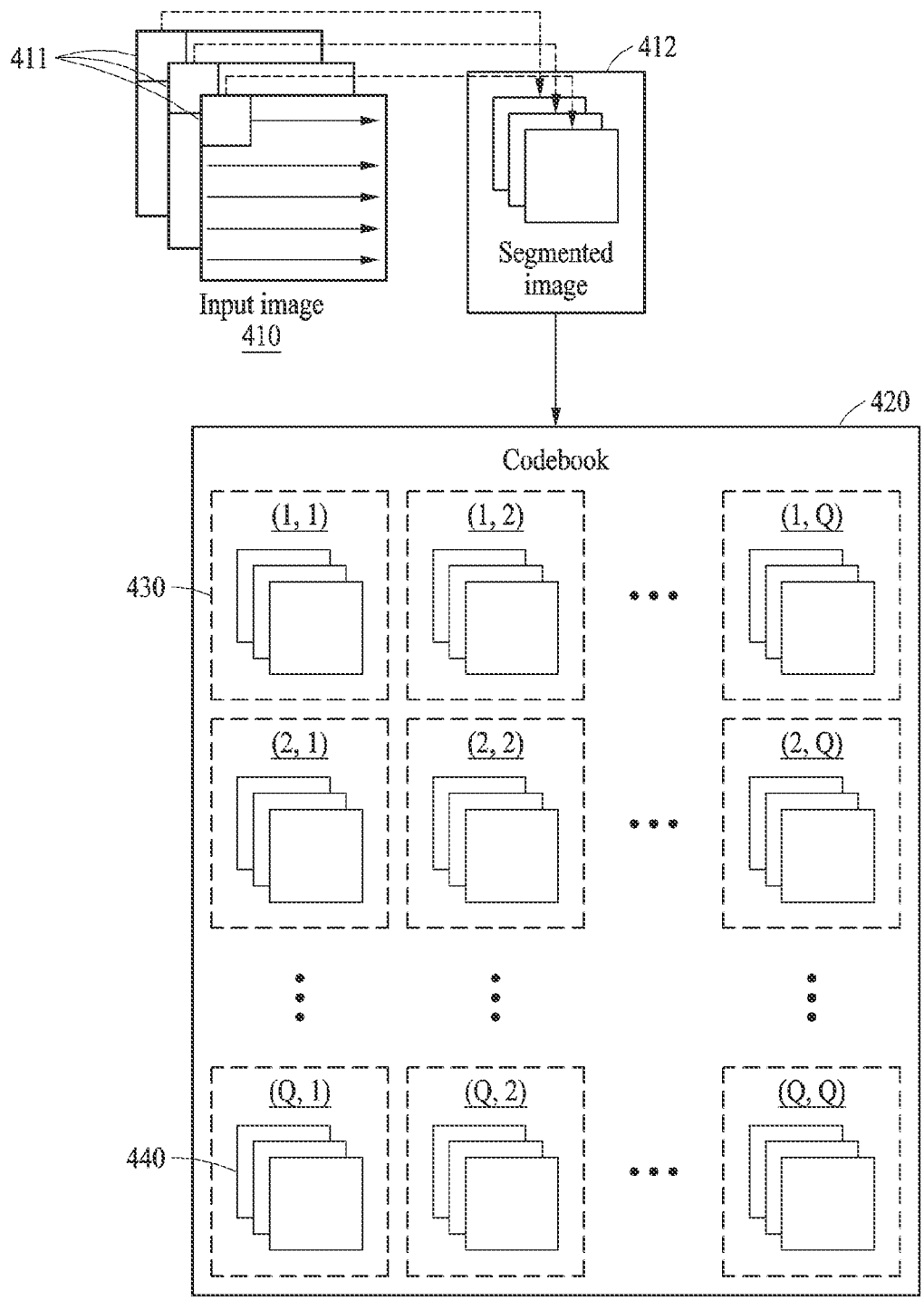
FIG. 4A illustrates various examples of a codebook and FIG. 4B illustrates a first feature map and a second feature map output according to various examples of a codebook.
Figure 4B:
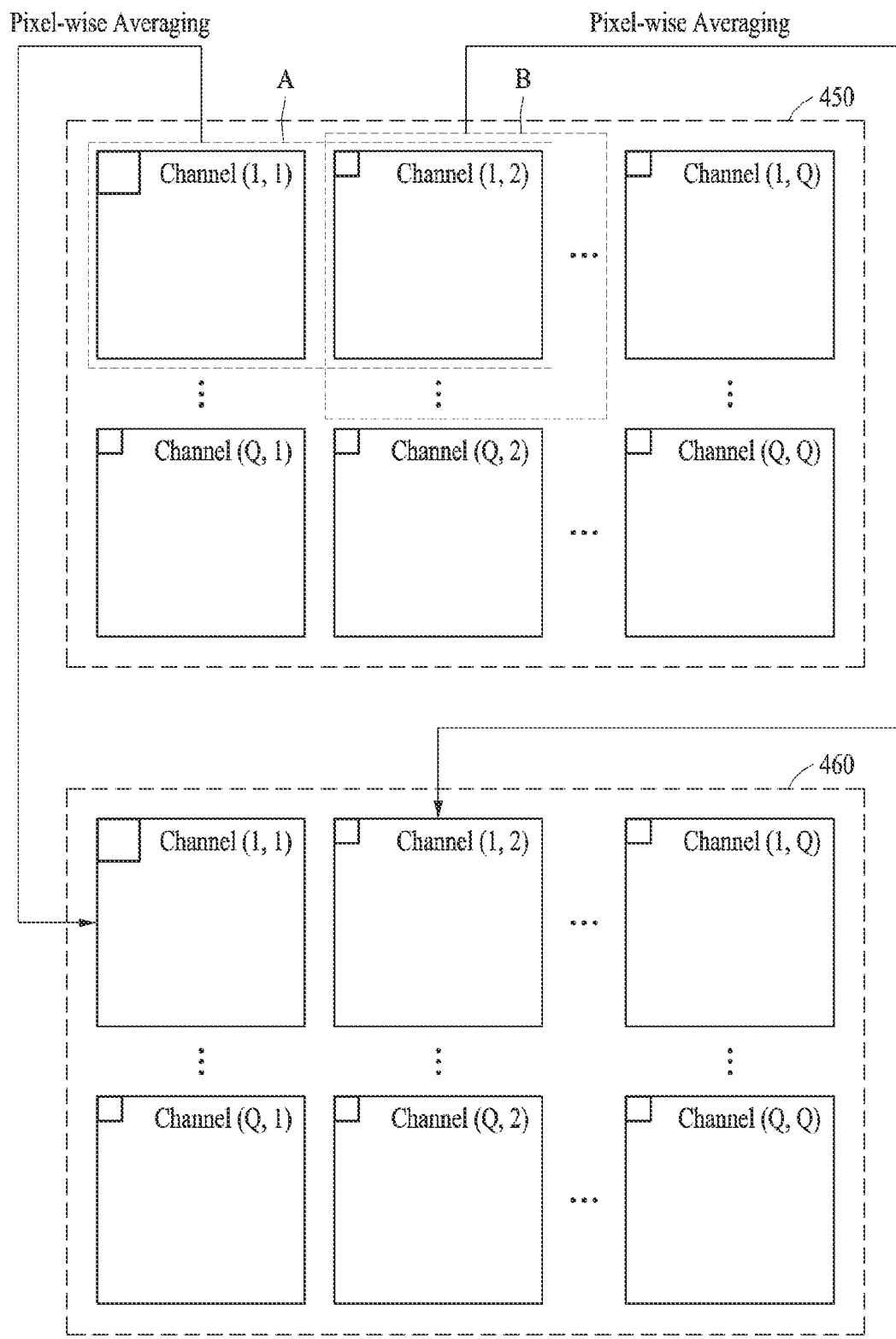

FIG. 4A illustrates various examples of a codebook 420 (e.g., the codebook 230 of FIG. 2) and FIG. 4B illustrates a first feature map 450 (e.g., the first feature map 240 of FIG. 2) and a second feature map 460 (e.g., the second feature map 250 of FIG. 2) according to the various examples of the codebook 420.

Referring to FIG. 4A, an electronic device (e.g., the electronic device 200 of FIG. 2) according to an example may identify an input image 410 (or an input map 410). The electronic device 200 may generate a plurality of segmented maps 412 from the input image 410 through a scan window 411. For example, when the size of the input image 410 is 3×32×32 and the size of the scan window 411 is 3×3, the electronic device 200 may generate 32×32 number of segmented images (or a segmented map 412) having a size of 3×3×3.

For example, an input layer of the codebook 420 may include input nodes corresponding to the size of the segmented maps 412. For example, when the size of the segmented maps 412 is 3×3×3, the number of input nodes may be 27.

For example, each of the segmented images may include pixel coordinates of the input image 410. For example, pixel coordinates of a segmented image generated where the center of the scan window 411 is positioned at (n, m) of the input image 410 may be (n, m).

Referring to FIG. 4A, the electronic device 200 according to an example may identify the codebook 420. For example, each of the output nodes 430 included in the codebook 420 may include position coordinates in an n-dimensional space. For convenience of description, FIG. 4A illustrates the plurality of output nodes 430 arranged in Q×Q in a 2D space and having position coordinates but is not limited thereto.

For example, each of the output nodes 430 may include a center vector 440 (or a codebook vector). For example, the size of the center vector 440 may be set equally to the size of the segmented map 412. For example, in FIG. 4A, the size of the center vector 440 may be 3×3×3.

Referring to FIGS. 4A and 4B, the electronic device 200 according to an example may output the first feature map 450 based on a distance between the segmented map 412 and the center vector 440.

As shown in FIG. 4B, each channel of the first feature map 450 may have the same size as the W×H of the input image 410. For example, the first feature map 450 may include the same number of channels as the number of output nodes 430. For example, when the number of output nodes 430 is Q×Q as in the above example, the number of channels of the first feature map 450 may be Q×Q. The position coordinates of the channels of the first feature map 450 may correspond to the position coordinates of the output nodes 430, respectively.

For example, a channel (n, m) of the first feature map 450 may include distances to the plurality of segmented maps 412, which are calculated based on the center vector 440 of the output node 430 of (n, m). For example, a value of a pixel (a, b) of the channel (n, m) of the first feature map 450 may correspond to a distance between the center vector 440 of the output node 430 of (n, m) and the segmented map 412 generated as the scan window 411 is positioned at a pixel (a, b) of each channel of the input image 410.

Referring to FIG. 4B, the electronic device 200 according to an example may calculate an average of channels within a set range based on the position coordinates of the channels included in the first feature map 450. The electronic device 200 may output the second feature map 460 using the position coordinates of the channels and the average of the channels.

For example, as shown in FIG. 4B, the electronic device 100 may calculate an average of channels (1, 1) and (1, 2) within a range A of the first feature map 450 and may output a channel (1, 1) of the second feature map 460. For example, each pixel of the channel (1, 1) of the second feature map 460 may represent the average of the channels (1, 1) and (1, 2) of the first feature map 450. For example, a pixel (1, 1) of the channel (1, 1) of the second feature map 460 may refer to the average of a pixel (1, 1) of the channel (1, 1) and a pixel (1, 2) of the channel (1, 1) of the first feature map 450.

In FIG. 4B, the electronic device 100 may calculate an average of the channel (1, 2) and a channel (1, 3) within a range B of the first feature map 450 and thus output the second feature map 460.

In FIG. 4B, the electronic device 100 may set the range A based on the position coordinates of the channel (1, 1) in the first feature map 450. The electronic device 100 may set the range B based on the position coordinates of the channel (1, 2) in the first feature map 450.

The electronic device 100 may perform a pixel-wise averaging on elements within the range A set based on the position coordinates of the channel (1,1) in the first feature map 450 and thus calculate the channel (1, 1) of the second feature map 460.

FIG. 4B illustrates an example in which the electronic device 200 outputs a channel (n, m) of the second feature map 460 based on an average of a channel (n, m) and a channel (n, m+1) of the first feature map 450. For example, a set range may be within 1 in the positive direction of the horizontal axis based on the position coordinates of the first feature map 450.

The example shown in FIG. 4B may correspond to one of various examples, and an example of calculating an average of channels based on position coordinates of the channels included in the first feature map 450 may be variously applied. For example, the electronic device 200 may calculate an average of a channel (n, m), a channel (n, m+1), a channel (n+1, m), and a channel (n+1, m+1) of the first feature map 450. For example, a set range may be within the range of √2 in positive directions of the horizontal axis and the vertical axis based on position coordinates of the first feature map 450.

In the above example, the position coordinates of channels in the first feature map 450 may correspond to the position coordinates of the output nodes 430, respectively. For example, the channel (1, 1) of the first feature map 450 may indicate a distance to the plurality of segmented maps 412, which is calculated by using the center vector 440 of the output node 430 of (1, 1).

Referring to FIG. 4A, the training device (e.g., the electronic device 200) according to an example may train the codebook 420. For example, the training device may train the codebook 420 to classify the input map 410 into at least one of a plurality of clusters. For example, classifying the input map 410 into one of the clusters may include classifying the input map 410 as corresponding to the closest output node among the plurality of output nodes 430 included in the codebook 420. The electronic device 200 may calculate distances between the segmented map 412 of the input map 410 and the center vector 440 of each of the output nodes 430, based on the trained codebook 420. The closest output node may correspond to the shortest distance among the calculated distances.

For example, the training device may calculate a distance between a training segmented map 412 segmented from a training input map 410 and the center vector 440. For example, the description of an operation in which the training device segments the training input map 410 to generate the training segmented map 412 may be identically applied to the description of the operation in which the electronic device 200 segments the input map 410 to generate the segmented map 412. For example, the center vector 440 of each of the output nodes 430 in the codebook 420 may be initialized with a random number.

For example, the training device may calculate the distance between the segmented map 412 and the center vector 440 of each of the output nodes 430 as shown in Equation 1 below, for example.

$$D_{p_1 p_2} = \sqrt{|H_{in} - W_{p_1 p_2}|^2} = \sqrt{\sum_{m=1}^{M} |h_m - w_{p_1 p_2 m}|^2} \qquad \text{Equation 1}$$

In Equation 1 above, p1 and p2 may each denote position coordinates of the output node 430, $D_{p1p2}$ may denote a distance between the segmented map 412 and the center vector 440 of the output node 430 of (p1, p2), $H_{in}$ may denote the segmented map 412, and $W_{p1p2}$ may denote the center vector 440 of the output node 430 of (p1, p2). $h_m$ may denote each pixel value of the segmented map 412 and $w_{p1p2}m$ may denote the pixel value of the center vector 440 of the output node 430 of (p1, p2).

For example, when the size of the segmented map 412 is 3×3×3, in each pixel value $h_m$ of the segmented map 412, h1 may denote a pixel value of (1, 1, 1), h2 may denote a pixel value of (1, 1, 2), and h27 may denote a pixel value of (3, 3, 3). The substantially same description may be applied to a pixel values' $w_{p1p2}m$ of the center vector 440 of the output node 430 of (p1, p2).

For example, the training device may determine a BMU having a minimum distance between the training segmented map 412 and the center vector 440 among the output nodes 430.

For example, the training device may determine the output node 430 of (p1, p2) of the minimum value $D_{p1p2}$ to be the BMU, in above Equation 1.

For example, the training device may determine the position coordinates (win$_1$, win$_2$) of the BMU as shown in Equation 2 below, for example.

$$(\text{win}_1, \text{win}_2) = \underset{(p_1, p_2)}{\text{argmin}} D_{p_1 p_2}, (1 \le p_1 \le P, 1 \le p_2 \le P) \quad \text{Equation 2}$$

For example, the electronic device 200 may update the center vector 440 of the BMU based on a distance between the BMU and the training segmented map 412.

For example, the training device may calculate distances between the output nodes 430 and the BMU based on the position coordinates of the output nodes 430. The training device may update the center vectors 440 of the output nodes 430 based on the distances between the output nodes 430 and the BMU.

For example, the training device may update the center vector 440 of the output node 430 of (p1, p2) as shown in Equation 3 below, for example.

$$W_{p1p2,new} = W_{p1p2,old} + \theta(t)L(t)(H_{in} - W_{p1p2,old}) \quad \text{Equation 3:}$$

In Equation 3 above, $W_{p1p2,new}$ may denote the center vector 440 updated of the output node 430 of (p1, p2), $W_{p1p2,old}$ may denote the center vector 440 of the output node 430 of (p1, p2) before update, θ(t) may denote a weight according to a distance between the BMU and the output node 430 of (p1, p2), and L(t) may denote a learning rate.

$$L(t) = L_0 \exp\left(-\frac{t}{\lambda}\right) \quad \text{Equation 4}$$

$$\theta(t) = \exp\left(-\frac{\sqrt{|(\text{win}_1, \text{win}_2) - (p_1, p_2)|^2}}{\sigma(t)}\right)$$

$$\sigma(t) = \sigma_0 \exp\left(-\frac{t}{\lambda}\right)$$

The weight θ(t) and the learning rate L(t) according to the distance in Equation 3 above may be calculated as in Equation 4, $L_0$, $\sigma_0$, and λ may denote initial values set by a user, and t may represent the number of training times.

Referring to Equation 4 above, as a distance between the output node 430 of (p1, p2) and the BMU increases, the weight θ(t) according to the distance may decrease. In Equation 4, the training device may render the weight (or the center vector 440) of the output node 430 close to the training segmented map 412 $H_{in}$ through update. The training device may update the weight of the output node 430 more immediately adjacent to the BMU to be greater than the weight of the output node 430 further away from the BMU.

Referring to Equation 4 above, as the number of training times increases, the size of the weight θ(t) and the learning rate L(t) according to the distance may decrease, so that the training device may update only the weight of the output node 430 adjacent to the BMU.

As described above, referring to FIG. 4A, the training device according to an example may generate the training segmented map 412 using the training input map 410 and may calculate distances between each of the training segmented maps 412 and the center vector 440 of the output node 430. The training device may determine the BMU based on the distance between the training segmented map 412 and the center vector 440 of the output node 430. The training device may update the center vector 440 of each of the output nodes 430 and thus train the codebook 420, based on the position coordinates of the BMU, the position coordinates of the output nodes 430, and distances between the training segmented map 412 and the center vector 440 of each of the output nodes 430.

The electronic device 200 may use the codebook 420, which is trained, to calculate a distance between the segmented map 412 obtained by segmenting the input map 410 and each of the center vectors 440.

Although, in the above FIGS. 3A and 3B and FIGS. 4A and 4B, an input of the input vector 310 is described separately from an input of the input map 410 for the convenience of description, an operation of the electronic device 100 shown in FIG. 3B may be similarly applied to the input of the input map 410. For example, in FIG. 3A where the input map 410 is input to the electronic device 100, the electronic device 100 may generate a plurality of segmented images from the input map 410 (e.g., an input image) using the scan window 411 with a set size. For example, when the size of a segmented image is 3×3×3, the segmented image may be substantially equal to the input vector 310 having "27" elements.

For example, the electronic device 100 may identify a segmented image with a size of 3×3×3 as the input vector 310 having "27" elements. The electronic device 100 may calculate distances between the center vectors 340 of the output nodes 330 having "27" weights and the input vector 310.

For example, the electronic device 100 may output a first feature vector as shown in FIG. 3B based on the distance between the segmented image and the center vector 340. For example, the electronic device 100 may generate the first feature map 450 as shown in FIG. 4B through combination with the first feature vector output according to each of segmented images. When an image is input to the electronic device 100 in FIG. 3A, the electronic device 100 may output the first feature map 450 and/or the second feature map 460 through an operation that is substantially the same as the operation shown in FIGS. 4A and 4B.

The training of the codebook 420 described above with reference to FIG. 4A may be substantially the same as the training of the codebook 320 shown in FIG. 3A.

Figure 5:
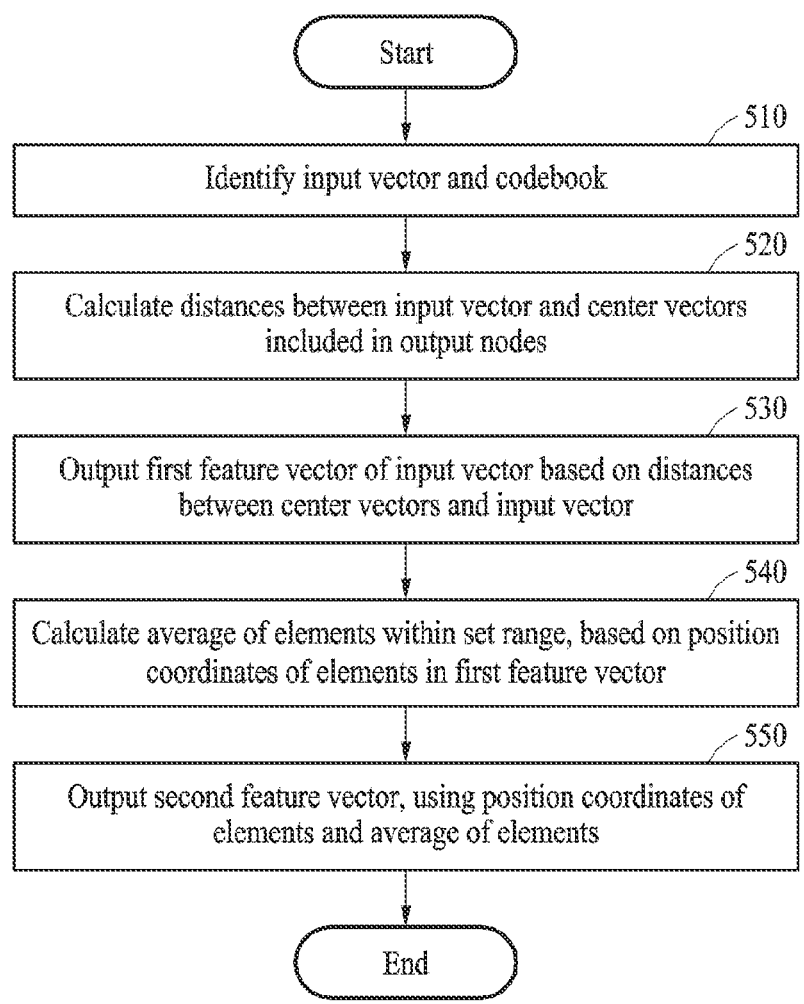
FIG. 5 illustrates various examples of a method of outputting a feature vector.

FIG. 5 illustrates various examples of a method of outputting a feature vector.

Referring to FIG. 5, an electronic device 100 according to various examples may identify an input vector 110 and a codebook 130, in operation 510.

For example, the electronic device 100 may calculate distances between center vectors 340 in a plurality of output nodes 330 and the input vector 110, in operation 520. For example, the plurality of output nodes 330 may include position coordinates. For example, the plurality of output nodes 330 may include position coordinates corresponding to position coordinates in an n-dimensional space.

For example, the plurality of output nodes 330 may include the center vector 340. For example, the center vector 340 may have the same dimension as the dimension of the input vector 110. For example, the center vector 340 may be called a weight, the vector of the codebook 130, and/or the like. For example, the electronic device 100 may calculate an Euclidean distance between the input vector 110 and the center vector 340.

For example, in operation 530, the electronic device 100 may output a first feature vector 140 of the input vector 110 based on the distance between the center vector 340 and the input vector 110. For example, the first feature vector 140 may include the same number of elements as the number of output nodes 330. For example, the elements included in the first feature vector 140 may include position coordinates corresponding to the plurality of output nodes 330.

For example, in operation 540, the electronic device 100 may calculate an average of elements within a set range based on the position coordinates of the elements included in the first feature vector 140. For example, when the plurality of output nodes 330 has position coordinates arranged in a Q×Q size in a 2D space, the elements of the first feature vector 140 may include the position coordinates arranged in the same Q×Q size as the plurality of output nodes 330. For example, the electronic device 100 may calculate an element (n, m) of a second feature vector 150 with an average of elements within a set range based on an element (n, m) of the first feature vector 140.

For example, in operation 550, the electronic device 100 may output the second feature vector 150 based on the position coordinates of the elements and the average of the elements. For example, the second feature vector 150 may have the same size as the first feature vector 140. For example, the element (n, m) of the second feature vector 150 may indicate the average of elements within the set range based on the element (n, m) of the first feature vector 140.

For example, operations shown in FIG. 5 may be performed by the electronic device 100 shown in FIG. 1.

Figure 6:
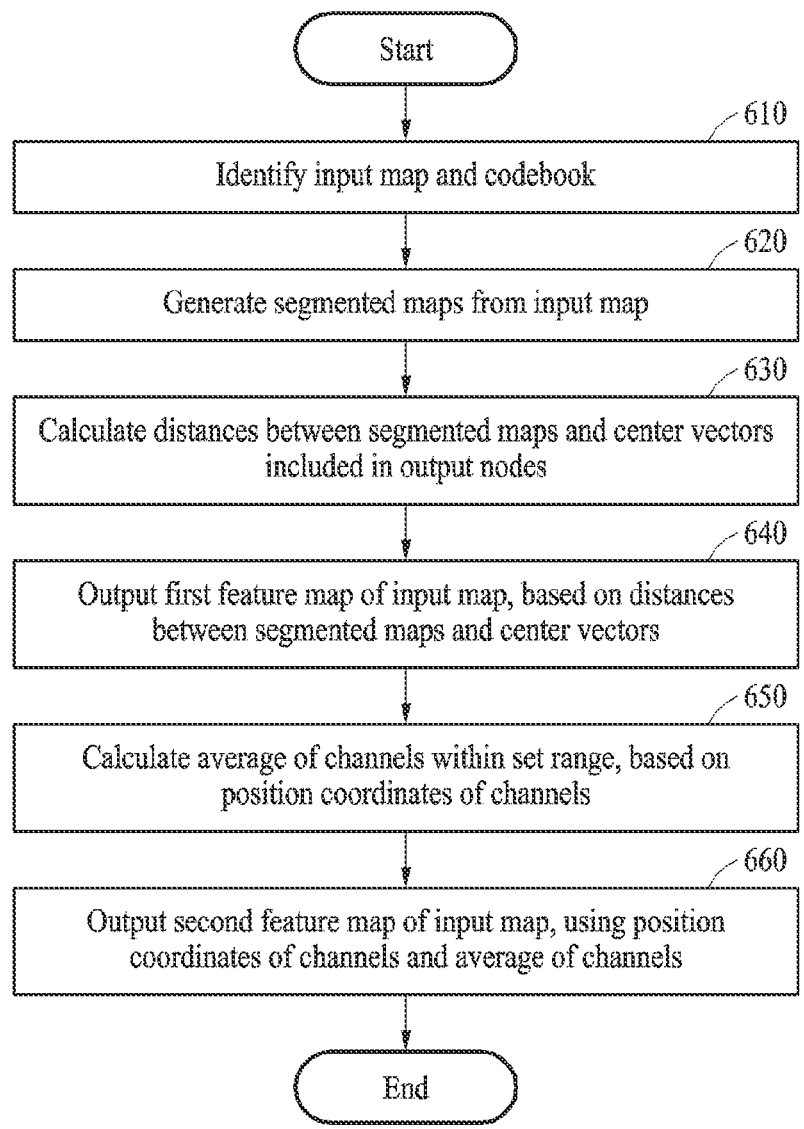
FIG. 6 illustrates various examples of a method of outputting a feature map.

FIG. 6 illustrates various examples of a method of outputting a feature map.

Referring to FIG. 6, an electronic device 200 according to various examples may identify an input map 210 and a codebook 230, in operation 610.

For example, the electronic device 200 may generate a plurality of segmented maps 412 from the input map 210, in operation 620. For example, the electronic device 200 may generate the plurality of segmented maps 412 from the input image 410 through a scan window 411. For example, the electronic device 200 may generate 32×32 number of segmented maps 412 having a size of 3×3×3, using the input map 210 having a size of 3×32×32 and the scan window 411 having a size of 3×3×3.

For example, each of the segmented maps 412 may include pixel coordinates. For example, the pixel coordinates of each of the segmented maps 412 may indicate pixel coordinates of the input map 210 positioned in the center of the scan window 411. For example, when C×W×H of the input map 210 is 3×32×32, the segmented map 412 generated where the center of the scan window 411 is at (1, 1) of an image of each channel may have pixel coordinates of (1, 1).

For example, the electronic device 200 may calculate distances between the center vectors 440 included in the plurality of output nodes 430 and the plurality of segmented maps 412, in operation 630. For example, the center vector 440 of the output node 430 may have the same size as the segmented map 412. For example, the electronic device 200 may calculate an Euclidean distance between the segmented map 412 and the center vector 440 of the output node 430.

For example, the plurality of output nodes 430 may include position coordinates. For example, the output node 430 may include position coordinates corresponding to position coordinates in an n-dimensional space.

For example, the electronic device 200 may output a first feature map 240 of the input map 210 based on the distances between the segmented maps 412 and the center vectors 440 in operation 640. For example, the first feature map 240 may include the same number of channels as the output nodes 430. For example, channels in the first feature vector 240 may include position coordinates corresponding to the plurality of output nodes 430.

For example, each of the channels in the first feature map 240 may have the same size as the W×H of the input map 210. For example, when the input map 210 is 3×32×32, the number of segmented maps 412 having a size of 3×3×3 is 32×32, and the output node 430 is 8×8, the electronic device 200 may generate the first feature map 240 having a size of 8×8. For example, a channel (1, 1) of the first feature map 240 may be calculated according to distances between 32×32 number of segmented maps 412 and the center vector 440 of the output node 430 of (1, 1). For example, a pixel (1, 1) of a channel (1, 1) may be a distance between pixel coordinates (1, 1) of the segmented map 412 and the center vector 440 of position coordinates (1, 1) of the output node 430. For example, a pixel (a, b) of a channel (n, m) may be a distance between pixel coordinates (a, b) of the segmented map 412 and the center vector 440 of position coordinates (n, m) of the output node 430.

As described above, each pixel value of the channel (n, m) of the first feature map 240 may be understood that distances between the plurality of segmented maps 412 and the center vector 440 of the output node 430 of (n, m) are arranged according to pixel coordinates of the segmented maps 412.

For example, the electronic device 200 may calculate an average of channels within a set range based on the position coordinates of the channels, in operation 650. For example, an average of channels within a range set based on the channel (n, m) of the first feature map 240 may be calculated. For example, the average of the channels may be calculated for each pixel of the channel.

For example, the electronic device 200 may output a second feature map 250 of the input map 210 based on the position coordinates of the channels and the average of the channels, in operation 660. For example, the second feature map 250 may have the same size as the first feature map 240. For example, a channel (n, m) of the second feature map 250 may be calculated as an average of channels within a range set based on the channel (n, m) of the first feature map 240.

For example, the operations shown in FIG. 6 may be performed by the electronic device 200 shown in FIG. 2.

In operation 550 of FIG. 5 and/or operation 660 of FIG. 6, the electronic devices 100 and 200 may output the second feature vector based on the average of the elements of the first feature vector and may output the second feature map 250 based on the average of the channels of the first feature map 240. In a typical electronic device, in a feature vector or a feature map extracted from input data, since each element corresponds to a different feature, the feature of the input data may not be properly extracted when an operation between elements or channels is performed. In contrast, the first feature vector 140 output by the electronic device 100 of one or more embodiments and/or the first feature map 240 output by the electronic device 200 of one or more embodiments given with reference to FIGS. 1 to 6 may include elements and/or channels of similar position coordinates which have similar features. This is because the trained codebook 230 is generated by reflecting topological features through a self-organizing map algorithm. In addition, this may be because nodes (e.g., the center vectors 440 of the plurality of output nodes 430 or vectors of the codebook 230) of the codebook 230 have a feature that similar nodes are positioned adjacent to each other in an n-dimensional space.

As described above, the electronic device of one or more embodiments may average an output value (e.g., the first feature vector or the first feature map 240) of nodes having similar features to output a second vector or the second feature map 250, such that even an error in an output value of an individual node may have less impact on the second vector or the second feature map 250, which is output finally.

In the case of a typical neural network that extracts feature vectors of input data, when the input data has an error (or noise), the feature vectors or feature maps extracted by the error may have a different feature from the feature of the input data. When an operation is performed according to a feature vector or a feature map including an error through each layer of a neural network, the error in the feature vector or feature map may accumulate, resulting in a difficulty in accurate calculation of the input data.

In contrast to the typical neural network, the feature vector and/or feature map generated according to the device and method of one or more embodiments shown in FIGS. 1 to 6 may minimize the impact of an error, which contributes to an accurate calculation.

Figure 7C:
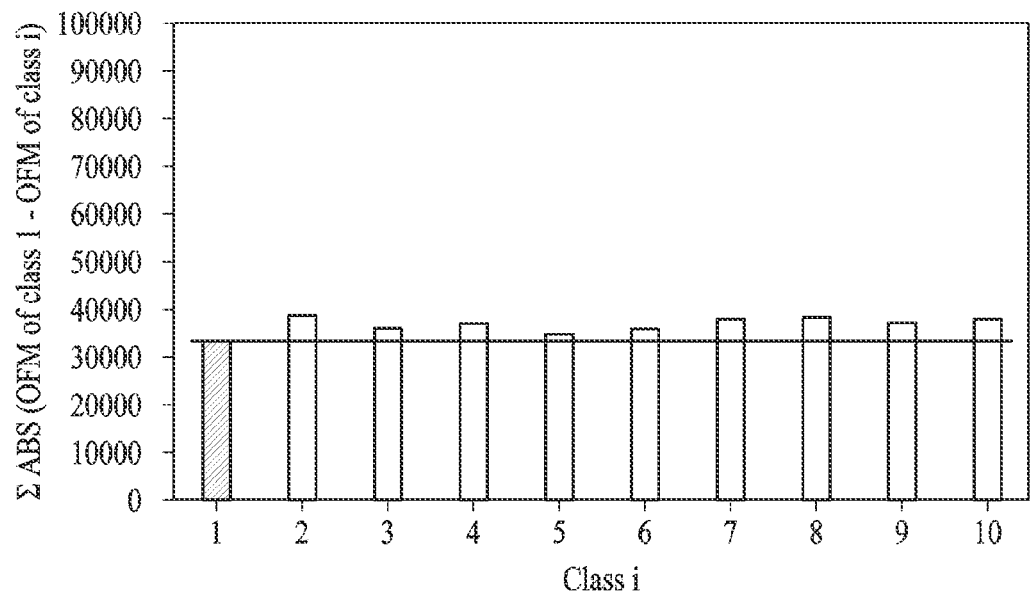
Figure 7C:
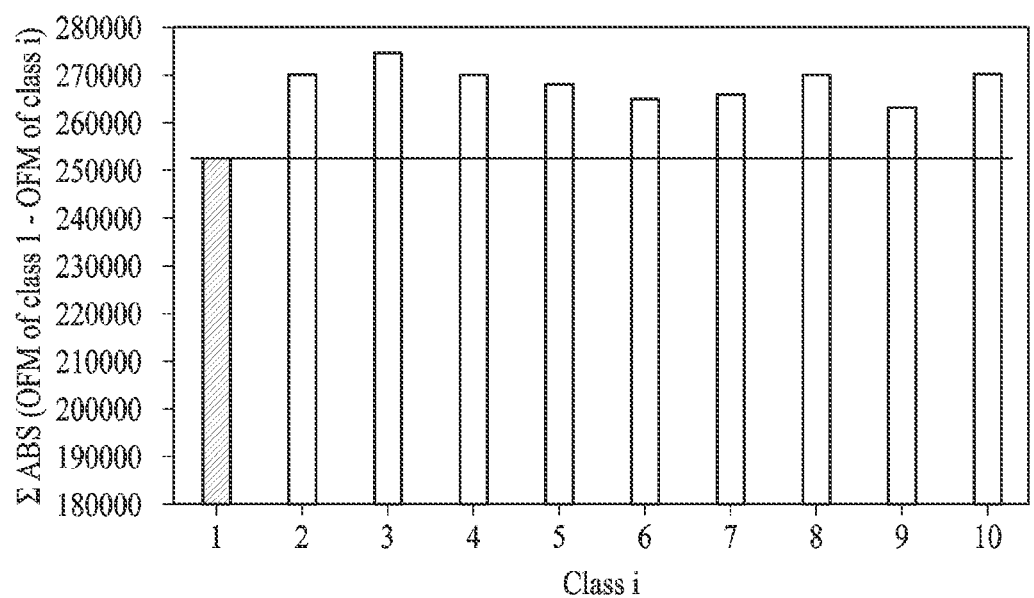

FIGS. 7A, 7B, and 7C illustrate various examples of distances for each class.

FIG. 7A illustrates distances between feature maps generated by inputting an input map classified into "10" classes through a convolution operation of a general CNN.

For example, in FIG. 7A, values in an OFM-Class #1 row and an OFM-Class #1 column may represent distances between feature maps generated through a convolution operation with respect to an input map corresponding to Class #1. In FIG. 7A, the values of the OFM-Class #1 row and the OFM-Class #2 column may represent a distance between a feature map generated through the convolution operation for the input map corresponding to Class #1 and a feature map generated through the convolution operation for an input map corresponding to Class #2.

FIG. 7B shows distances between feature maps generated by inputting an input map classified into "10" classes according to various examples shown in FIGS. 1 to 6.

$$Diff = \sum_{c=1}^{64}\sum_{w=1}^{32}\sum_{h=1}^{32} |OFM_1(c, w, h) - OFM_2(c, w, h)| \quad \text{Equation 5}$$

For example, a distance for each class with reference to FIGS. 7A and 7B may be calculated according to Equation 5 above, for example. In Equation 5 above, $OFM_1(c,w,h)$ and $OFM_2(c,w,h)$ may denote a pixel position value of a c-th channel (w, h) of each output feature map.

For example, an average of Diff values between output feature maps generated from input images in the same class and an average of Diff values between output feature maps generated from input images in different classes may be calculated.

In addition, feature maps may be compared in the same manner by adding a random number having a Gaussian distribution to each pixel of the feature map generated through each method. Through such a comparison, whether a feature map retains valid information for class classification may be identified even when an operation error occurs.

FIG. 7C illustrates an average of Diff operation results between a feature map generated through an input map corresponding to Class #1 and a feature map generated through an input map corresponding to each class in FIGS. 7A and 7B.

In FIG. 7C, the upper graph illustrates an average of Diff operation results of a feature map generated according to the convolution operation method described with reference to FIG. 7A, and the lower graph illustrates an average of Diff operation results of a feature map generated according to various examples of FIGS. 1 to 6 shown with reference to FIG. 7B.

Referring to FIG. 7C, the feature map generated through a convolution operation may have a slight difference between a Diff value among the same classes and a Diff value among different classes. This may refer to that even when a small random number is added to a pixel value of a feature map, the feature map may likely be deformed into a form similar to a feature map of a completely different class.

On the other hand, the feature map generated according to various examples may have a large difference between a Diff value among the same classes and a Diff value among different classes. This may indicate that even when a random number is added to a pixel value of a feature map in some degree, the feature map may remain as a feature map of the same class.

For example, a random number having a Gaussian distribution at a level of sigma 1.0 may be generated. When a generated random number is added to each pixel of the feature map generated according to the convolution method and to each pixel of the feature map generated according to the method described with reference to FIGS. 1 to 6 and then a Diff value between the feature maps is calculated to obtain an average value, the feature map generated through the convolution operation may have almost no difference between a Diff value among the same classes and a Diff value among different classes, similar to the examples illustrated in FIGS. 7A and 7B. However, the feature map generated according to the method described with reference to FIGS. 1 to 6 may have a difference to the extent that a Diff value among the same classes is less than a Diff value among different classes even when a random number is added to a pixel value of the feature map.

As described above, when a random number is added to the feature map generated by the convolution operation, it may indicate that the feature map to which the random number is added loses a feature that an original class is supposed to have. On the other hand, when a random number is added to the feature map generated according to the examples given with reference to FIGS. 1 to 6, it may indicate that the feature map to which the random number is added retains a feature representing an applicable class.

The electronic devices, processors, memories, electronic device 100, processor 120, memory 160, electronic device 200, processor 220, memory 260, and other apparatuses, devices, and components described and disclosed herein with respect to FIGS. 1-7C are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7C that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A processor-implemented method, the method comprising:
   determining distances between an input vector and center vectors comprised in a plurality of output nodes comprised in a trained codebook; and
   outputting a first feature vector of the input vector based on the distances between the center vectors and the input vector,
   wherein the trained codebook is trained by:
      determining a distance between a training input vector and the center vector for each of the output nodes;
      determining, among the plurality of output nodes, a best matched unit (BMU) in which a distance between the training input vector and the center vector of the BMU is minimized; and
      training the codebook by updating the center vector of the BMU and one or more other center vectors of the output nodes, based on the distance between the training input vector and the center vector of the BMU.

2. The method of claim 1, wherein the training of the codebook comprises:
   determining distances between the plurality of output nodes and the BMU, using position coordinates of the plurality of output nodes; and
   training the codebook by updating the center vectors of the plurality of output nodes, based on the distances between the plurality of output nodes and the BMU.

3. The method of claim 2, wherein the updating of the center vectors of the plurality of output nodes comprises:
   determining a plurality of weights based on the distances between the plurality of output nodes and the BMU; and
   updating the center vectors of the plurality of output nodes by respectively applying the weights to the center vectors.

4. The method of claim 3, wherein the determining of the weights comprises, in response to a first distance being greater than a second distance among the distances between the plurality of output nodes and the BMU, determining a first weight determined based on the first distance to be less than a second weight determined based on the second distance among the weights.

5. The method of claim 1, further comprising:
   based on position coordinates of elements comprised in the first feature vector, determining an average of elements within a set range; and
   outputting a second feature vector, using the position coordinates of the elements and the average of the elements,
   wherein the position coordinates of the elements correspond to position coordinates of the plurality of output nodes.

6. The method of claim 5, further comprising outputting an output feature vector by inputting the second feature vector into a convolutional neural network.

7. The method of claim 1, further comprising generating the input vector by:
   generating a plurality of segmented images from an input image, using a scan window having a set size; and
   generating the input vector, using the plurality of segmented images,
   wherein the outputting of the first feature vector of the input vector comprises outputting a first feature map of the input image, based on a distance between the center vector and the input vector for each of the plurality of segmented images.

8. The method of claim 7, further comprising:
   based on position coordinates of channels comprised in the first feature map, determining an average of channels within a set range; and
   outputting a second feature vector, using the position coordinates of the channels and the average of the channels,
   wherein the position coordinates of the channels correspond to position coordinates of the plurality of output nodes.

9. A non-transitory computer-readable storage medium storing instructions that, when executed by one or more processors, configure the one or more processors to perform the method of claim 1.

10. A processor-implemented method, the method comprising:
    generating a plurality of segmented maps from an input map;
    determining distances between the plurality of segmentation maps and center vectors comprised in a plurality of output nodes comprised in a trained codebook; and
    outputting a first feature map of the input map, based on the distances between the plurality of segmentation maps and the center vectors,
    wherein the trained codebook is trained by:
       determining distances between the center vectors and a training segmented map segmented from a training input map;
       determining, among the plurality of output nodes, a best matched unit (BMU) in which a distance between the training segmented map and the center vector of the BMU is minimized; and
       training the codebook by updating the center vector of the BMU, based on the distance between the training segmented map and the center vector of the BMU.

11. The method of claim 10, wherein the training of the codebook comprises:
    determining distances between the plurality of output nodes and the BMU, using position coordinates of the plurality of output nodes; and
    training the codebook by updating the center vectors of the plurality of output nodes, based on the distances between the plurality of output nodes and the BMU.

12. The method of claim 11, wherein the updating of the center vectors of the plurality of output nodes comprises:
    determining a plurality of weights based on the distances between the plurality of output nodes and the BMU; and
    updating the center vectors of the plurality of output nodes by respectively applying the weights to the center vectors.

13. The method of claim 12, wherein the determining of the weights comprises, in response to a first distance being greater than a second distance among the distances between the plurality of output nodes and the BMU, determining a first weight determined based on the first distance to be less than a second weight determined based on the second distance among the weights.

14. The method of claim 10, further comprising:
based on position coordinates of channels comprised in the first feature map, determining an average of channels within a set range; and
outputting a second feature map, using the position coordinates of the channels and the average of the channels,
wherein the position coordinates of the channels correspond to position coordinates of the plurality of output nodes.

15. An electronic device comprising:
one or more processors configured to:
determine distances between an input vector and center vectors comprised in a plurality of output nodes comprised in a trained codebook; and
output a first feature vector of the input vector, based on the distances between the center vectors and the input vector, wherein the trained codebook is trained by:
determining a distance between a training input vector and the center vector for each of the output nodes;
determining, among the plurality of output nodes, a best matched unit (BMU) in which a distance between the training input vector and the center vector of the BMU is minimized; and
training the codebook by updating the center vector of the BMU and one or more other center vectors of the output nodes, based on the distance between the training input vector and the center vector of the BMU.

16. The electronic device of claim 15, wherein the training of the codebook comprises:
determining distances between the plurality of output nodes and the BMU, using position coordinates of the plurality of output nodes; and
training the codebook by updating the center vectors of the plurality of output nodes, based on the distances between the plurality of output nodes and the BMU.

17. The electronic device of claim 15, wherein the one or more processors are configured to:
based on position coordinates of elements comprised in the first feature vector, determine an average of elements within a set range; and
output a second feature vector, using the position coordinates of the elements and the average of the elements,
wherein the position coordinates of the elements correspond to position coordinates of the plurality of output nodes.

18. The electronic device of claim 15, wherein the one or more processors are configured to:
generate a plurality of segmented images from an input image, using a scan window having a set size;
generate the input vector, using the plurality of segmented images; and
output a first feature map of the input image, based on a distance between the center vector and the input vector for each of the plurality of segmented images.

19. The electronic device of claim 18, wherein the one or more processors are configured to:
based on position coordinates of channels comprised in the first feature map, determine an average of channels within a set range; and
output a second feature vector, using the position coordinates of the channels and the average of the channels,
wherein the position coordinates of the channels correspond to position coordinates of the plurality of output nodes.

20. The electronic device of claim 15, further comprising a memory storing instructions that, when executed by the one or more processors, configure the one or more processors to perform the determining of the distances between the input vector and the center vectors comprised in the plurality of output nodes and the outputting of the first feature vector.

* * * * *